United States Patent
Godard

(10) Patent No.: US 11,932,103 B2
(45) Date of Patent: Mar. 19, 2024

(54) DEVICE FOR FASTENING A PRESSURIZED GAS TANK TO A FRAME

(71) Applicant: FAURECIA SYSTEMES D'ECHAPPEMENT, Nanterre (FR)

(72) Inventor: Yannick Godard, Blussans (FR)

(73) Assignee: FAURECIA SYSTEMES D'ECHAPPEMENT (FR)

(*) Notice: Subject to any disclaimer, the term of this patent is extended or adjusted under 35 U.S.C. 154(b) by 226 days.

(21) Appl. No.: 17/569,597

(22) Filed: Jan. 6, 2022

(65) Prior Publication Data

US 2022/0212535 A1 Jul. 7, 2022

(30) Foreign Application Priority Data

Jan. 7, 2021 (FR) ..................................... 21 00115

(51) Int. Cl.
*B60K 15/07* (2006.01)
*B60K 15/063* (2006.01)
*B60K 15/067* (2006.01)

(52) U.S. Cl.
CPC ...... *B60K 15/07* (2013.01); *B60K 2015/0638* (2013.01); *B60K 2015/0675* (2013.01)

(58) Field of Classification Search
CPC ............ B60N 15/07; B60K 2015/0638; B60K 2015/0675
USPC ....................................................... 280/834
See application file for complete search history.

(56) References Cited

U.S. PATENT DOCUMENTS

2007/0119646 A1 5/2007 Minami

FOREIGN PATENT DOCUMENTS

| CA | 2290259 A1 * | 5/2001 | ............ B60K 15/07 |
|----|--------------|--------|------------|
| DE | 19735501 A1 * | 2/1999 | ........... B60R 21/272 |
| DE | 102017102245 A1 | 8/2017 | |
| DE | 102017011492 A1 | 6/2019 | |
| FR | 3099094 A | 1/2021 | |
| JP | 2017149316 A | 8/2017 | |
| JP | 6468215 B2 * | 2/2019 | |

OTHER PUBLICATIONS

JP-6468215-B2 (Ohashi Yasuhiko) (Feb. 13, 2019) (Machine Translation) (Year: 2019).*
Preliminary Search Report for French Application No. 2100115 dated Aug. 30, 2021.

* cited by examiner

*Primary Examiner* — Mahmoud Gimie
(74) *Attorney, Agent, or Firm* — Carlson, Gaskey & Olds, P.C.

(57) ABSTRACT

A device fastens a tank for pressurized gas, such as hydrogen, to a frame. The tank comprises a base including a cylindrical seat. The device comprises a fastener able to clamp the cylindrical seat of the base, where the device also comprises at least one mechanical fuse that is able to break in case of impact experienced by the frame, so that the device releases the base from the frame.

7 Claims, 3 Drawing Sheets

[Fig. 1]
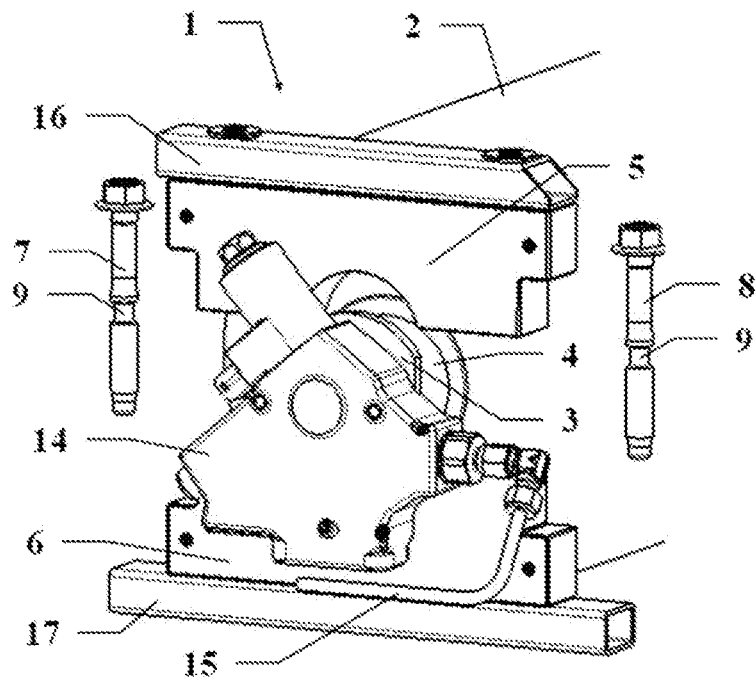
[Fig. 2]
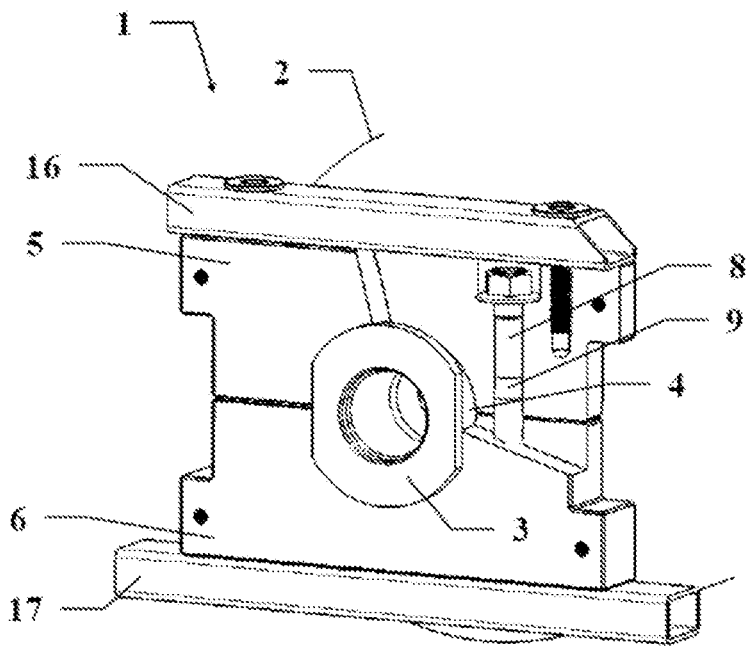

[Fig. 3]
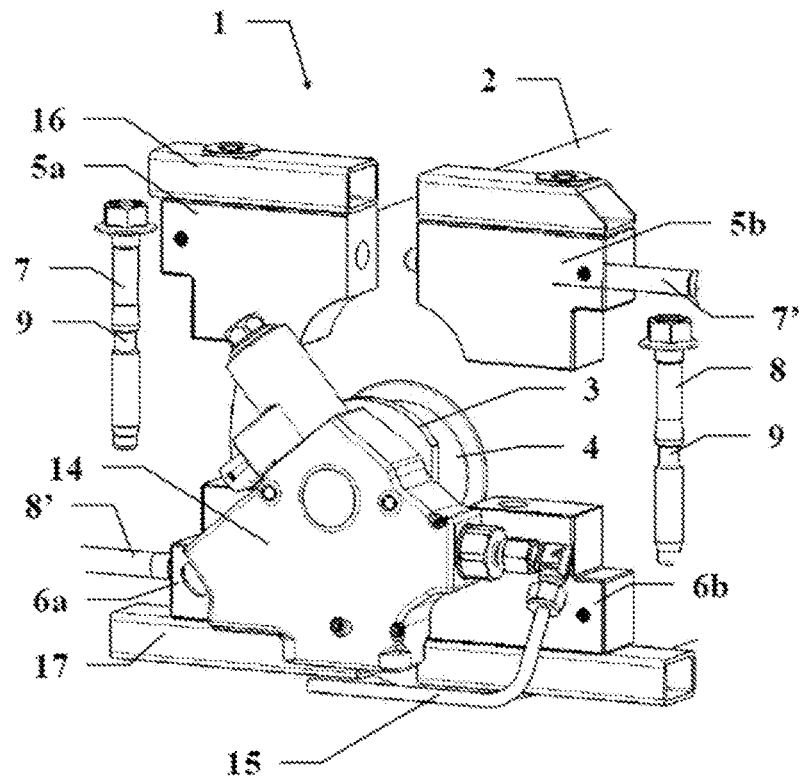
[Fig. 4]
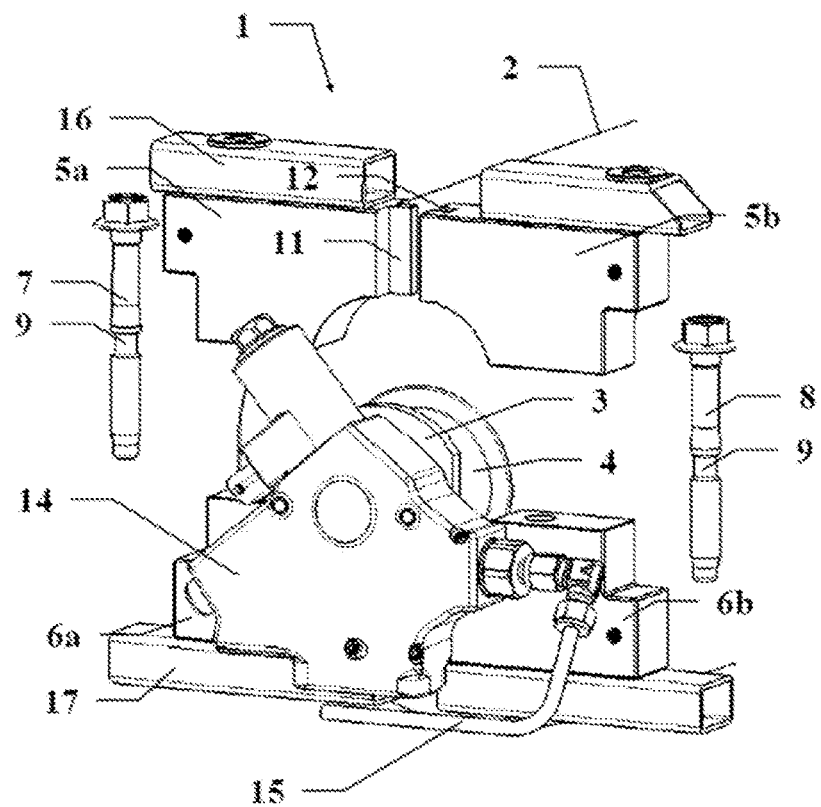

[Fig. 5]
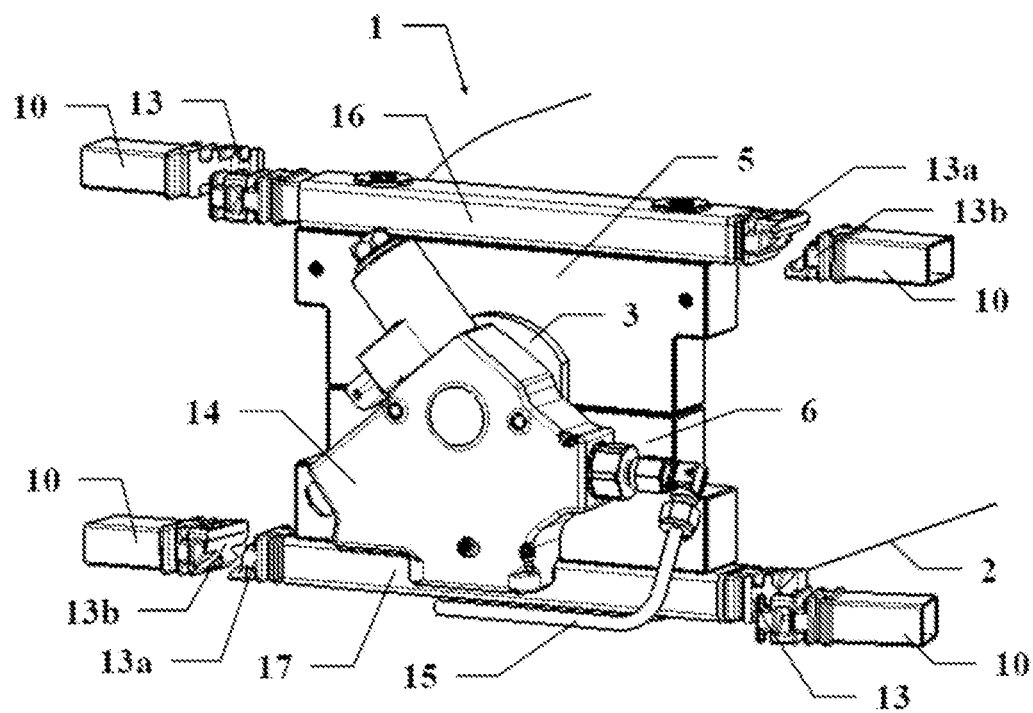
[Fig. 6]
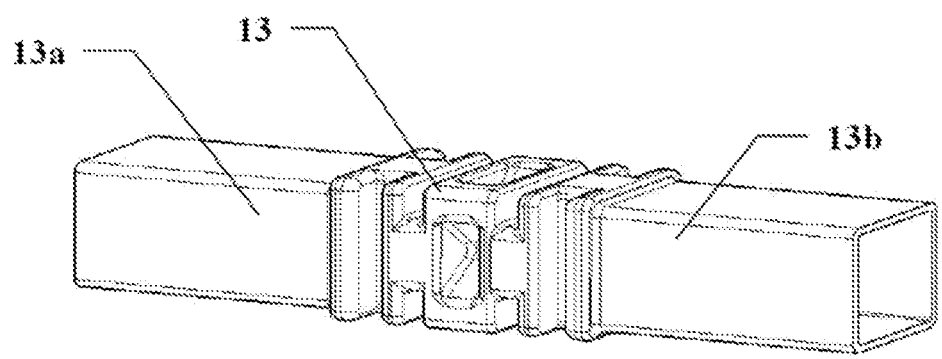

US 11,932,103 B2

DEVICE FOR FASTENING A PRESSURIZED GAS TANK TO A FRAME

CROSS-REFERENCE TO RELATED APPLICATIONS

This application is a U.S. non-provisional application claiming the benefit of French Application No. FR 21 00115, filed on Jan. 7, 2021, which is incorporated herein by reference in its entirety.

TECHNICAL FIELD

The disclosure relates to a device for fastening a pressurized gas tank to a frame.

BACKGROUND

It is known to make a tank for pressurized gas, such as hydrogen, using a container, for example a composite structure, that is lined from the inside with an elastomer casing. Such a tank also comprises a base, passing through the structure and the casing. This base comprises a through channel to produce an interface between the inside and the outside of the tank. On the outside, the base accommodates, connected to the channel, a valve assembly, or OTV (On Tank Valve), to allow gas to be filled and drawn off, and to perform safety functions.

The base comprises a cylindrical seat surrounding the channel and arranged near the valve assembly. It is also known to produce a device for fastening the tank to a frame, typically arranged in a motor vehicle. To this end, the fastening device comprises a fastener able to clamp the cylindrical seat of the base to hold the tank by its neck.

In case of substantial impact, such as a crash of the carrying motor vehicle, the fastening device may possibly transmit some of the impact experienced by the frame to the base or to the valve assembly. Such impact loads may damage the base or valve assembly, may cause the base to be pulled out of the tank structure, or may cause the valve assembly to be pulled out of the base, causing a gas leak, which is not desirable.

In case of a substantial impact event, it is preferable to release the tank.

SUMMARY

The subject disclosure provides a device to fasten a gas tank to a frame, which breaks in case of impact, to release the tank and not to transmit the impact to the base.

The disclosure relates to a device for fastening a tank for pressurized gas, such as hydrogen, to a frame. The tank comprises a base including a cylindrical seat. The device comprises a fastener able to clamp the cylindrical seat of the base, where the device also comprises at least one mechanical fuse, able to break in case of impact experienced by the frame, so that the device releases the base from the frame.

Specific features or embodiments, usable alone or in combination, are:
  the fastener comprises at least two jaws and at least two screws assembling the two jaws by gripping them against one another while clamping the cylindrical seat between them, and the at least fuse is made by weakening said at least two screws, so as to break in case of impact, so that the at least two jaws separate from one another and release the base,
  each of the two jaws comprises a first half-jaw and a second half-jaw,
  the device also comprises a screw assembling the first and second half-jaws by gripping them against one another, and a fuse is made by weakening said screws so as to break in case of impact, so that the first and second half-jaws separate from one another and release the base,
  a first half-jaw 5a, 6a comprises a tongue and a second half-jaw comprises a groove able to receive the tongue, and a fuse is made by the tongue and/or the groove, sized so as to break in case of impact, so that the half-jaws separate from one another and release the base,
  a fuse is made by at least one fastening point between a jaw and the frame, weakened so as to break in case of impact, so that the jaw separates from the frame.

In a second aspect of the disclosure, a tank assembly comprises a tank for pressurized gas, such as hydrogen, and such a device.

In a third aspect of the disclosure, a motor vehicle comprises such a tank.

BRIEF DESCRIPTION OF THE DRAWINGS

The disclosure will be better understood upon reading the following description, provided solely as an example, and done in reference to the appended figures, in which:
  FIG. 1 shows, in exploded perspective view, a first embodiment of the disclosure,
  FIG. 2 shows, in partially sectional perspective view, the embodiment of FIG. 1, with the valve assembly removed,
  FIG. 3 shows, in exploded perspective view, another embodiment,
  FIG. 4 shows, in exploded perspective view, another embodiment,
  FIG. 5 shows, in exploded perspective view, another embodiment,
  FIG. 6 shows, in perspective view, the detail of a fastening point.

DETAILED DESCRIPTION

As shown in FIG. 1, the disclosure relates to a device 1 for fastening a pressurized gas tank 2 to a frame 10 (FIG. 5). Such a tank 2 is provided to contain a gas, such as hydrogen, under high pressures, typically of approximately 700 bars.

Such a tank 2 is typically built around a cylindrical composite structure terminating at each end in a substantially hemispheric shell. The tank 2 is pierced by an opening at least at one point, conventionally in the center of a hemispheric shell. A base 3, substantially of revolution, is arranged in this opening. The base 3 is pierced with an axial through channel, connecting the inside of the tank to the outside, to allow the filling and drawing off of gas. A valve assembly 14 or OTV, which performs the filling and drawing off functions, is arranged on the base 3 and in contact with the channel.

A piping 15 connects the tank 2, via the valve assembly 14, to at least one gas consumer. The valve assembly 14 also performs safety functions. Thus, in case of any damage of the piping 15, the valve assembly 14 is able to detect a leak following such damage and to close a valve to stop the leak.

The base 3 includes an outer cylindrical seat 4 along the axis of revolution of the base 3. The valve assembly 14 is conventionally arranged at the distal end of the base 3. Conversely, the cylindrical seat 4 is more proximal.

The fastening device 1 is of the type holding the tank 2 by clamping the base 3 at the cylindrical seat 4. To this end, the device 1 comprises a fastener 5, 6 able to clamp the cylindrical seat 4 of the base 3. The device 1 is also able to be fastened to the frame 10.

Therefore, in case of a substantial impact of the vehicle carrying the frame 10, the frame 10 transmits forces to the fastening device 1, which would be able to transmit them to the base 3. These forces may break the base 3, pull the base 3 out of the structure of the tank 2, break the valve assembly 14, or pull the valve assembly 14 out of the base 3, thus creating a gas leak that would be challenging to contain.

The idea at the base of the disclosure is that in case of an excessive impact, the fastening device 1 breaks to release the tank 2 and so that the base 3 remains intact and secured to the structure of the tank 2 and the valve assembly 14 remains intact and secured to the base 3.

Once the tank 2 is released, it may move relative to the frame 10. This may potentially lead to damage of the gas piping 15, which then remains the only connection between the tank 2 and the frame 10. Such damage may produce a gas leak. However, if the valve assembly 14 and the base 3 are intact and secured, this type of a leak is not as disadvantageous. In fact, the valve assembly 14 is equipped with an excess flow valve that blocks gas from exiting if a vacuum pressure is detected following leakage from the piping 15, preventing the gas from spreading outside the tank 2.

According to the disclosure, the device 1 is provided to break beyond a certain force value to release the base 3 and the tank 2, rather than having the forces be transmitted to the base 3 or to the valve assembly 14.

To this end, the device 1 further comprises at least one mechanical fuse 9. Said at least one fuse 9 is designed to break in case of impact experienced by the frame 10 and transmitted to the device 1. The breaking of said at least one fuse 9 is such that the device 1 releases the base 3 from the frame 10, allowing them to separate.

According to one feature, the fastener comprises at least two jaws 5, 6 and at least two screws 7, 8 assembling the two jaws 5, 6 by gripping them against one another, on either side of the neck/base 3, while clamping the cylindrical seat 4 between them. As illustrated, the two jaws 5, 6 are horizontal, the jaw 5 being upper and the second jaw 6 being lower, and the screws 7, 8 assembling them are vertical.

According to a first embodiment of a fuse 9, more particularly illustrated in FIGS. 1 and 2, a fuse 9 is made by weakening said at least two screws 7, 8, causing said screws 7, 8 to break in case of impact so that the jaws 5, 6 separate from one another and release the base 3 that they were clamping. The weakening is done by any manner, such as forging or machining of each screw 7, 8, so as to reduce its diameter and thus to initiate a break.

According to another feature, more particularly illustrated in FIGS. 3 and 4, at least one of the two jaws 5, 6, or both, is (are) divided substantially in two. Thus, the first jaw 5 is divided so as to comprise a first left half-jaw 5a and a second right half-jaw 5b. The second jaw 6 is divided so as to comprise a first left half-jaw 6a and a second right half-jaw 6b.

According to another feature, more particularly illustrated in FIG. 3, the device 1 also comprises a screw 7', 8' assembling two half-jaws 5a, 5b, 6a, 6b by gripping them against one another. As illustrated, the half-jaws 5a, 5b, 6a, 6b are vertical and the screws 7', 8' assembling them are horizontal.

According to another embodiment of a fuse 9, a fuse 9 is made by weakening said screw 7', 8' to break in case of impact, so that the associated half-jaws 5a, 5b, 6a, 6b separate from one another and release the base 3.

According to another feature, more particularly illustrated in FIG. 4, a first half-jaw 5a, 6a comprises a tongue 11 and a second half-jaw 5b, 6b comprises a groove 12 able to accommodate the tongue 11.

According to another embodiment of a fuse 9, a fuse 9 is made by a tongue 11 and/or a groove 12, sized to break in case of impact, so that the associated half-jaws 5a, 5b, 6a, 6b separate from one another and release the base 3. The tongue 11 can be weakened to break. Alternatively or additionally, the groove 12, or more specifically at least one of the two, or both walls forming the groove 12, can be weakened to break.

It is of course understood that all three of the preceding embodiments of the fuse 9 can be freely used alone or in combination. Thus, if the screws 7', 8' are weakened, the screws 7, 8 may alternatively not be weakened or additionally be weakened. Likewise, the use of a tongue 11 and groove 12, as illustrated in FIG. 4, may be combined with weakened screws 7', 8' assembling the half-jaws 5a, 5b, 6a, 6b.

According to another embodiment of a fuse 9, at least one fuse 9 is made by at least one fastening point 13. Such a fastening point 13 is arranged between a jaw 5, 6 and the frame 10, or if applicable between a half-jaw 5a, 5b, 6a, 6b and the frame 10. In the figures a fastening point 13 is arranged between the frame 10 by its end 13b and a support 16, 17 respectively secured to a jaw 5, 6 or a pair of half-jaws 5a, 5b, 6a, 6b. A fastening point 13 is weakened so as to break in case of impact, so that the jaw 5, 6, respectively the half-jaw 5a, 5b, 6a, 6b, separates from the frame 10. Advantageously, an embodiment comprising the same number of weakened fastening points 13 as fastening zones of the device 1 to the frame 10 allows a complete separation of the device 1 with respect to the frame 10. The illustrated example has four fastening zones of the device 1 to the frame 10 and therefore four weakened fastening points 13.

According to another feature, each fastening point 13 comprises a first part 13a, secured to the device 1, and a second part 13b, secured to the frame 10, able to be clipped so as to be able to be assembled to one another.

This last embodiment, which is based on fastening points 13, can of course be implemented alone, in that it suffices to release the tank 2, or can also be combined with any one of the preceding embodiments.

Each of the fastening points 13 is weakened along a favored direction or breaking plane. This direction or plane may be arranged along any desired orientation, independently for each of the fastening points 13. This allows a device 1 to be configured to break according to a given force application direction scenario, for example derived from a crash scenario.

Likewise, the various fuse(s) 9, among the first screws 7, 8, the second screws 7', 8', or the tongues 11/grooves 12, can be chosen and oriented based on a given force application scenario.

It will appear to the person skilled in the art that a combination of the various embodiments makes it possible to combine one or several force application directions and therefore possible breaks.

The materials from which each of the components of the device 1 are made: the jaws 5, 6, the half-jaws 5a, 5b, 6a, 6b, the screws 7, 8, the screws 7', 8', the fastening points 13, can be chosen independently from a plastic material, a composite material or a metal material. The choice of the material can be determined based on the rupture force that the component can bear, as a function of the selected force application scenario.

The disclosure also relates to a tank assembly comprising a tank 2 for pressurized gas, such as hydrogen, and such a device 1.

The disclosure also relates to a motor vehicle comprising such a tank assembly.

The disclosure has been illustrated and described in detail in the drawings and the description above. This must be considered illustrative and to be provided as an example, and not to limit the disclosure to this description alone. Many variant embodiments are possible.

LIST OF REFERENCE SIGNS

1: fastening device,
2: tank,
3: base,
4: cylindrical seat,
5: upper jaw,
5*a*: left upper half-jaw,
5*b*: right upper half-jaw,
6: lower jaw,
6*a*: left lower half-jaw,
6*b*: right lower half-jaw,
7: left screw,
7': upper screw,
8: right screw,
8': lower screw,
9: fuse,
10: frame,
11: tongue,
12: groove,
13: fastening point,
14: valve assembly, OTV,
15: piping,
16: upper support,
17: lower support.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A device for fastening a tank for pressurized gas, such as hydrogen, to a frame, the tank comprising a base including a cylindrical seat, the device comprising:
   a fastener able to clamp the cylindrical seat of the base, and where the fastener comprises at least two jaws and at least two screws assembling the at least two jaws by gripping the at least two jaws against one another while clamping the cylindrical seat between the at least two jaws; and
   at least one mechanical fuse able to break in response to an impact experienced by the frame, so that the device releases the base from the frame, and where the at least one mechanical fuse is made by weakening the at least two screws to break in case of impact, so that the at least two jaws separate from one another and release the base.

2. The device according to claim 1, where each of the at least two jaws comprises a first half-jaw and a second half-jaw.

3. The device according to claim 2, comprising an additional screw assembling the first and second half-jaws by gripping the first and second half-jaws against one another, and the at least one mechanical fuse is made by weakening the additional screws to break in case of impact, so that the first and second half-jaws separate from one another and release the base.

4. The device according to claim 2, where the first half-jaw comprises a tongue and the second half-jaw comprises a groove able to receive the tongue, and where the at least one mechanical fuse comprises the tongue and/or the groove, sized to break in case of impact, so that the first and second half-jaws separate from one another and release the base.

5. A tank assembly comprising:
   a tank for pressurized gas; and
   the device according to claim 1.

6. A motor vehicle comprising:
   the tank assembly according to claim 5.

7. A device for fastening a tank for pressurized gas, such as hydrogen, to a frame, the tank comprising a base including a cylindrical seat, the device comprising:
   a fastener able to clamp the cylindrical seat of the base; and
   at least one mechanical fuse able to break in response to an impact experienced by the frame, so that the device releases the base from the frame, and wherein the at least one mechanical fuse made by at least one fastening point between a jaw and the frame, wherein the at least one fastening point is weakened to break in case of impact, so that the jaw separates from the frame.

* * * * *